No. 759,438. PATENTED MAY 10, 1904.
M. A. HEATH.
TIRE SECURING DEVICE.
APPLICATION FILED JUNE 10, 1903.
NO MODEL.
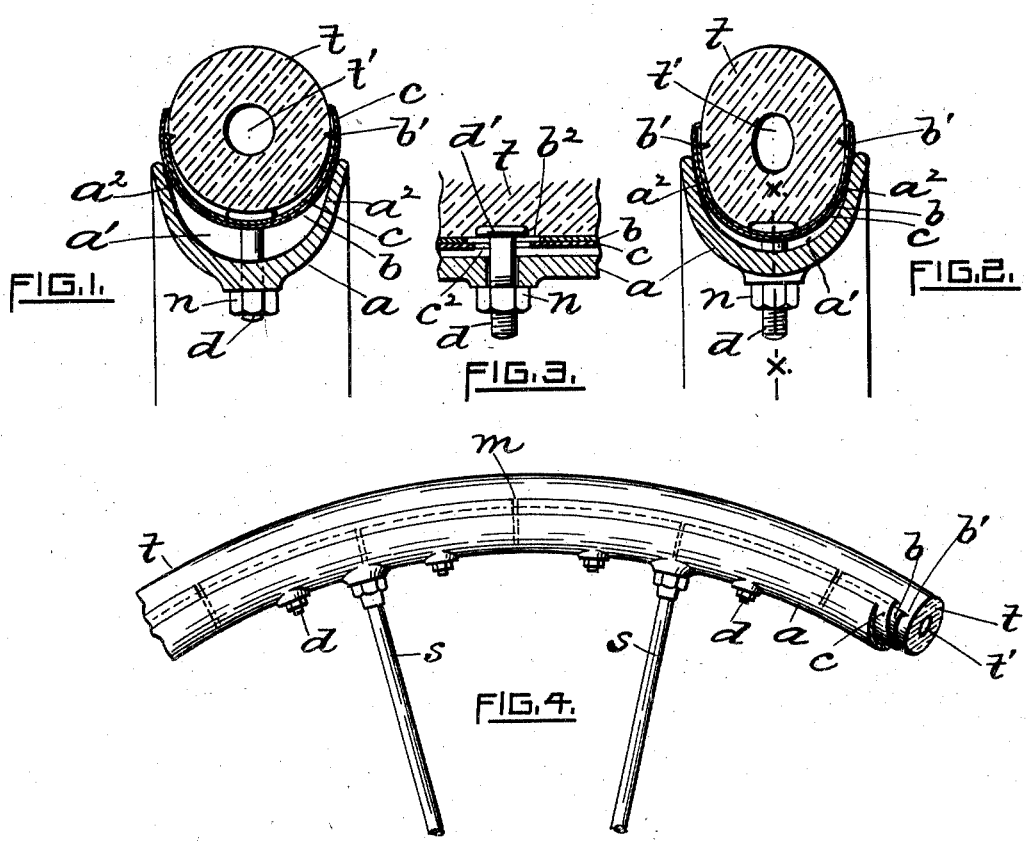
WITNESSES. INVENTOR.

No. 759,438. Patented May 10, 1904.

UNITED STATES PATENT OFFICE.

MARK A. HEATH, OF PROVIDENCE, RHODE ISLAND.

TIRE-SECURING DEVICE.

SPECIFICATION forming part of Letters Patent No. 759,438, dated May 10, 1904.

Application filed June 10, 1903. Serial No. 160,843. (No model.)

*To all whom it may concern:*

Be it known that I, MARK A. HEATH, a citizen of the United States of America, and a resident of Providence, in the county of Providence and State of Rhode Island, have invented certain new and useful Improvements in Tire-Securing Devices, of which the following is a specification.

My invention relates to an improved tire-securing device for wheels having resilient tires; and it consists, essentially, of a wheel having a peripherally-grooved metallic rim, an inner series of yielding or spring strips, substantially semicircular cross-sectionally, adapted to snugly engage the tire member, an outer series of spring strips or sections interposed between said rim and the other series of strips, and bolts passing radially through the several metal members arranged whereby upon tightening the bolts the springs and tire are drawn inwardly or downwardly into the grooved portion of the rim, the adjacent concave or beveled sides of the latter at the same time serving to materially contract or compress the springs and tire transversely, thereby adjustably securing the tire to the wheel-rim, all as will be more fully hereinafter set forth and claimed.

In the accompanying drawings, Figure 1 is a transverse sectional view showing the device combined with the tire and wheel-rim, the parts being in position preparatory to contracting the springs and tire into the peripheral groove of the rim. Fig. 2 is a similar view showing the device in the normal operative position. Fig. 3 is a partial longitudinal section taken on line $x$ $x$ of Fig. 2; and Fig. 4 is a side view, in reduced scale, of my improved tire-securing device, a portion of the wheel being represented.

The following is a more detailed description of my improved tire-securing device and the manner of its operation: The wheel-rim $a$, which may be integral, is or may be made of steel or other suitable material and provided with a peripheral groove or recess $a'$. The form of said groove cross-sectionally may be practically semicircular and having flaring or beveled sides $a^2$ $a^2$. At intervals around its circumference the rim is adapted to receive suitable bolts $d$ (later described) and spokes $s$, the latter being secured to the rim in any well-known or suitable manner.

$t$ designates the tire member. It may be made of rubber or other elastic and resilient material. The tire may be a one-piece ring or hoop, its form cross-sectionally preferably being round and having a small central hole $t'$, although the latter may be omitted, if desired.

$b$ and $c$ designate two series or sets of curvilinear strips of thin resilient stock, as steel, bent to conform to the shape of the tire. I prefer to make these spring members or strips comparatively short peripherally, each section or piece being, say, six to eight inches long, the members of one series being arranged to break joints or overlap those of the other. (See Fig. 4.) The inner strips $b$ are bent to receive the tire. The upper or outer edges extend to or nearly to the center and may be further bent inwardly to a slight extent, as at $b'$, so as to be embedded into the tire when sufficient pressure is exerted upon the parts. The outer strips $c$ form a yielding seat for the inner series $b$. The sides, however, extend somewhat above or beyond those of the latter, as clearly shown in Fig. 1.

The springs $b$ $c$ are provided circumferentially at intervals with elongated holes $b^2$ $c^2$, respectively, as indicated in Fig. 3, to receive the securing-bolts $d$. These latter have each a suitable head $d'$ and nut $n$.

The manner of assembling, applying, and securing the tire, and as embodied in my present invention, is as follows: The sections of the two series of spring-strips $b$ and $c$ are successively placed in position around the inner circumference of the tire $t$, at the same time inserting the bolts $d$, the resiliency of the strips causing the sides thereof to bear with sufficient force against the tire to prevent them from being accidentally detached. The tire and its strips are next sufficiently expanded to pass over the edge of the rim $a$, the springs at the same time sliding endwise upon each other, while the slotted bolt-holes $b^2$ $c^2$ permit the bolts to maintain their normal relation. The inner or free ends of the bolts are inserted in the holes formed therefor in the rim, after which the natural reaction or contraction of the tire $t$ causes the parts to bear against the flaring sides $a^2$ of the rim, followed by attaching the nuts $n$, the whole then appearing substantially as represented in Fig. 1. Now in order to firmly secure the tire, &c., in the normal working position and relation the several bolts $d$ are by means of the nuts $n$ drawn downwardly, thereby causing the oppositely-disposed yielding sides of the strips $b$ and $c$ bearing against the beveled unyielding sides $a^2$ of the rim to bend or spring toward each other, the result being to gradually compress the tire from its original or round form cross-sectionally to an oval one.

It is obvious that in accomplishing this result the sides of the springs are forced snugly against the sides of the tire and become more or less embedded therein. It will be seen, too, that the recess or groove $a'$ of the rim will then be nearly or quite filled by the spring and tire members, as clearly shown in Fig. 2.

Fig. 4 represents a corresponding side view of the rim and tire portions of a wheel embodying the invention. I prefer to have the several strips or spring-sections separated from one another endwise or longitudinally, as indicated at $m$.

I do not claim, broadly, a resilient wheel-tire capable of being held in position in the grooved wheel-rim by means of spring-strips or yielding clamps secured to said rim.

I claim as my invention—

1. In a vehicle-wheel provided with a peripherally-grooved rim having flaring sides, a rubber tire, bent clips or inner spring-strips $b$ arranged around the rim and in engagement with the tire, a series of peripherally-arranged outer clips $c$ interposed between said inner clips and the rim, and securing-bolts passing through both series of clips and rim, substantially as described and for the purpose set forth.

2. The combination with a rubber tire and a peripherally-grooved rim $a$ having beveled or flaring sides, of inner clamping-strips $b$ conforming to the shape of the tire, outer spring or clamping strips $c$ interposed between said rim and strip members, $a\ b$, and extending radially beyond the edges of the strips $b$, and securing means passing through the clamping members and rim, whereby the tire may be drawn downwardly into the grooved portion of the rim, substantially as described.

Signed at Providence, Rhode Island, this 8th day of June, 1903.

MARK A. HEATH.

Witnesses:
 GEO. H. REMINGTON,
 WILLIAM A. SULLIVAN.